United States Patent [19]
Martin

[11] Patent Number: 5,316,037
[45] Date of Patent: May 31, 1994

[54] VALVE FOR INSERTION IN A PRESSURIZED FLUID FLOW LINE

[75] Inventor: Joseph R. Martin, Covington, Ky.

[73] Assignee: Jomar International, Ltd., Madison Heights, Mich.

[21] Appl. No.: 113,855

[22] Filed: Aug. 30, 1993

[51] Int. Cl.[5] .................. F16K 43/00; F16L 55/128
[52] U.S. Cl. ........................... 137/318; 30/93;
138/89; 138/94; 138/97; 408/67; 408/72 R;
408/101; 408/207
[58] Field of Search ............... 30/93; 83/835; 137/15,
137/315, 318, 321; 138/89, 93, 94, 94.3, 97;
408/67, 72 R, 72 B, 101, 204, 207

[56] References Cited
U.S. PATENT DOCUMENTS

| | | | |
|---|---|---|---|
| 3,532,113 | 10/1970 | McKean | 137/318 |
| 3,833,020 | 9/1974 | Smith | 137/318 |
| 3,863,667 | 2/1975 | Ward | 137/318 |
| 3,867,964 | 2/1975 | Gardner | 137/318 |
| 4,205,697 | 6/1980 | Gebelius | 137/318 |
| 4,552,170 | 11/1985 | Margrave | 137/318 |
| 4,628,955 | 12/1986 | Smith | 137/318 |
| 4,719,936 | 1/1988 | Tsubakimoto et al. | 137/318 |
| 5,018,421 | 5/1991 | Lucki et al. | 83/835 |
| 5,076,311 | 12/1991 | Marschke | 137/318 |
| 5,152,310 | 10/1992 | O'Bryon | 137/318 |
| 5,183,364 | 2/1993 | Hardwig | 137/318 |

FOREIGN PATENT DOCUMENTS
2044171 10/1980 United Kingdom .................. 83/835

Primary Examiner—George L. Walton
Attorney, Agent, or Firm—Robert G. Mentag

[57] ABSTRACT

A valve adapted for insertion in a pressurized fluid flow line for blocking and sealing the flow of fluid through the line without disconnecting the line and to maintain the pressure in the upstream end of the line. The valve includes two body portions which may be clamped on the fluid flow line to form a valve body in which is adjustably mounted a shaft carrying an annular hole cutter and a tubular seal. The shaft is rotatable for driving the annular hole cutter through the line and to position the tubular seal in the hole cut through the line to block and seal flow through the downstream portion of the line.

6 Claims, 5 Drawing Sheets

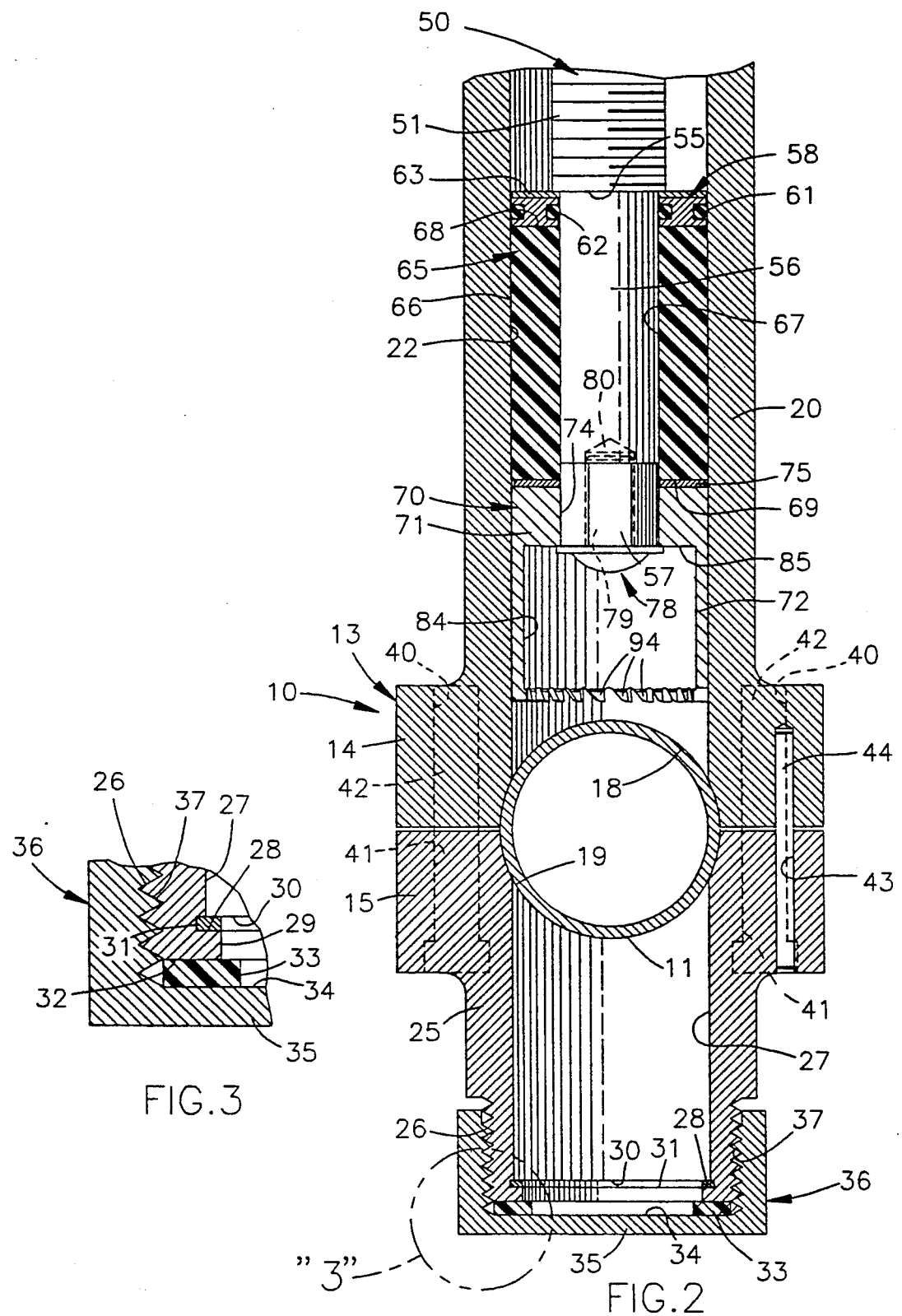

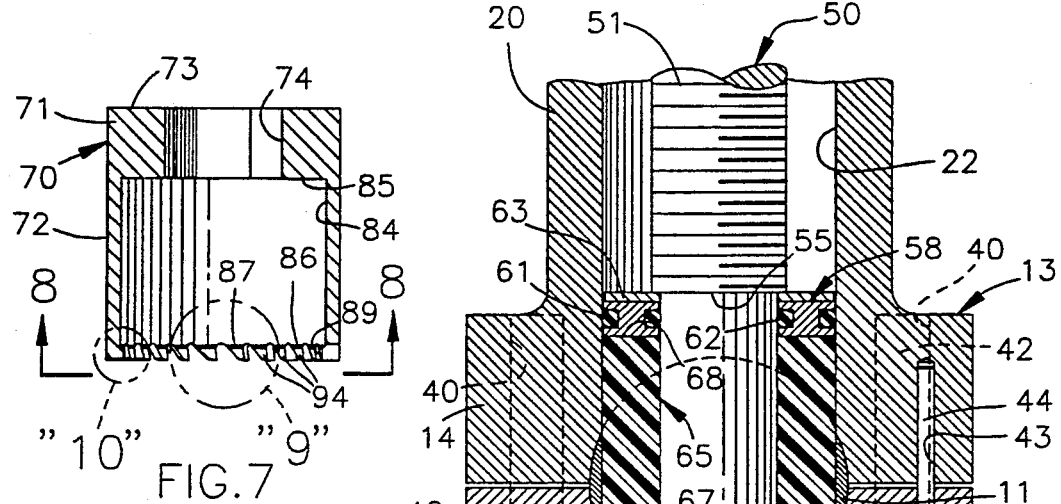
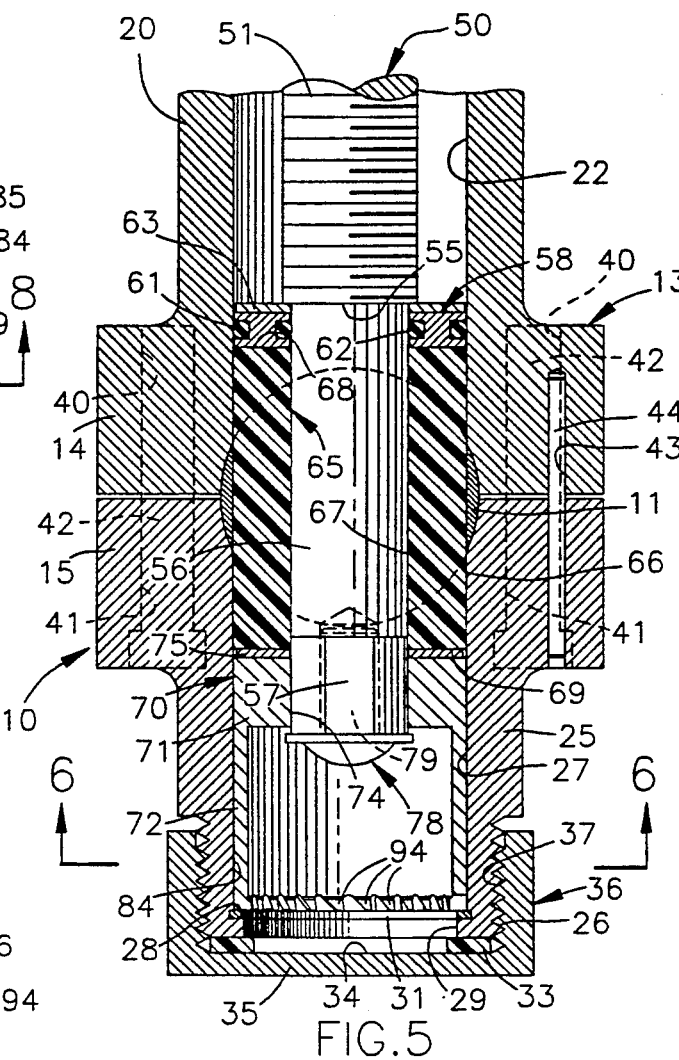
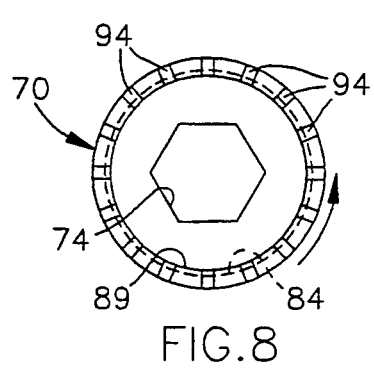
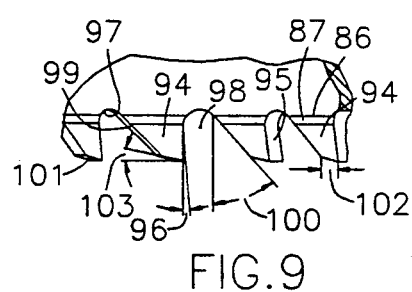
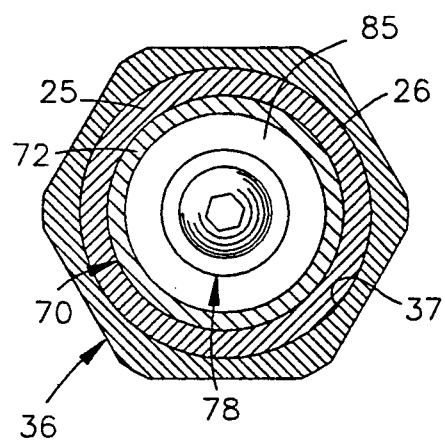
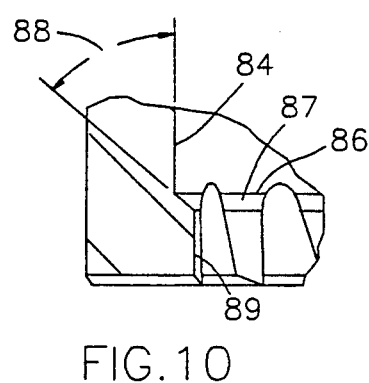

VALVE FOR INSERTION IN A PRESSURIZED FLUID FLOW LINE

BACKGROUND OF THE INVENTION

1. Field of the Invention

The field of art to which this invention pertains may be generally located in the class of devices relating to valves. Class 137, Fluid Handling, Subclass 318 United States Patent Office Classification, appears to be the applicable general area of art to which the subject matter similar to this invention has been classified in the past.

2. Description of the Prior Art

It is necessary in many instances to terminate the flow of fluid through a fluid flow system, such as a gas line or a liquid line, because of a failure in the fluid flow system due to a leaking valve, a crack in the fluid flow line, or other problems which require the fluid flow system to be shutdown to make the required repairs. It is also necessary in many instances, because of required maintenance or changes in a water system, a refrigeration system, an air conditioning system and other fluid flow systems to temporarily shutdown such systems for many hours. Such problems can involve the loss of many work hours, and the closing of buildings containing fluid flow systems wherein the flow of fluid therethrough must be terminated for either a short period or a long period.

Heretofore it has been proposed to provide a valve insertable in a fluid flow line which could be attached to the fluid flow line and which included a hole cutter means for cutting a hole through the fluid flow line and placing a tubular seal in the hole to block the flow of fluid downstream of the blocked hole. Such a line insertable valve is disclosed and described in U.S. Pat. No. 4,552,170 to Margrave. However, experience has shown that the Margrave line insertable valve disclosed in said patent failed in practice when it was attempted to put it in actual use. The failure of the Margrave valve shown in said patent was due to inherent structural defects which permitted fluid leakage from the porous cast metal body employed in the Margrave valve, as well as leakage through the opening in the valve body for the shaft carrying the hole cutter. Furthermore, the hole cutter employed in the Margrave valve was incapable of cutting through both walls of a fluid flow line on which said valve was mounted, due to jamming of the hole cutter by the slug removed from the first wall of the fluid flow line. The Margrave valve was incapable of sealing the hole cut through the first wall of a line because of the jamming failure of the hole cutter as well as the inefficient sealing action of the tubular seal employed in the Margrave valve.

SUMMARY OF THE INVENTION

It is an object of the present invention to provide a novel valve for insertion in a pressurized fluid flow line without making any disconnection of the line to terminate the flow of fluid through the fluid flow line and enable downstream repairs or installations on new equipment.

It is another object of the present invention to provide a valve for insertion in a pressurized fluid flow line which overcomes the aforestated problems encountered by the prior art line insertable valve disclosed in U.S. Pat. No. 4,552,170.

The valve for insertion in a pressurized fluid flow line of this invention employs a forged body and associated structure which overcomes some of the leakage problems incurred by the prior art valves of this type and which are due to the porosity of the cast body construction of such prior art valves. The valve of the present invention includes an upper body structure and a lower body structure which are adapted to be releasably and sealingly mounted over a fluid flow line. A shaft having a threaded upper end is threadably and rotatably mounted in the upper body structure for advancing and retracting movements of the shaft. An annular hole cutter is operatively mounted on the shaft, on the lower end thereof, for rotatable movement with the shaft and for longitudinal movement relative to the shaft when the cutter engages a stop means in the lower body structure. A tubular seal is operatively mounted on a cylindrical portion of the shaft, in a position with its lower end in engagement with the upper end of the annular hole cutter. An O-ring seal carrier is mounted on the cylindrical portion of the shaft, above the upper end of the tubular seal member and with the lower end thereof in engagement with the upper end of the tubular seal member. The O-ring seal carrier has its upper end in engagement with a shoulder on the shaft at the upper end of the cylindrical portion of the shaft.

The O-ring seal carrier has operatively mounted thereon an outer diameter O-ring seal which sealingly engages the bore within the valve body structure within which the shaft is rotatably mounted, and an internal diameter O-ring seal which sealingly engages a periphery of the shaft portion on which the O-ring seal carrier is mounted.

The threaded upper end of the shaft is threadably mounted through and extends to the exterior of the upper valve body structure and is provided with a hexagonal shaped end for engagement with a turning wrench or other tool. When the shaft is rotated to advance it into the valve body structure, the cutting tooth end of the annular hole cutter engages the first or upper wall of the fluid flow line on which the valve is mounted, and continued rotation of the shaft causes the annular hole cutter to cut a slug out of the fluid flow line upper or first wall, and said slug is passed upwardly into a holding chamber within the annular hole cutter and is retained therein while the shaft is advanced to advance the annular hole cutter through the fluid flow line and down to a cutting engagement with the lower or second wall of the fluid flow line to a cut a hole therethrough. The advancement of the shaft brings the cutting teeth on the annular hole cutter into engagement with a stop ring in the lower body structure and further rotation of the annular hole cutter moves the tubular seal into the hole cut in the fluid flow line, and such a continued rotation causes the lower end of the shaft to slide through an axial hexagonal connection hole in the upper wall of the cutter to create an upward axial compression on the tubular seal to cause the tubular seal to expand radially outward between the O-ring seal carrier and the upper end of the annular hole cutter against the periphery of the openings cut in the upper and lower walls of the fluid flow line to block and seal the flow of fluid through the fluid flow line.

The upper and lower body structures are made from a heavy duty forged brass which overcomes the disadvantageous porosity inherent in a cast bronze body as employed in the aforementioned Margrave valve. The O-ring seals and the tubular seal for blocking the flow after it is positioned in a hole cut through a fluid flow line are preferably made from a "VITON" elastomeric material. The O-ring seals on the shaft prevents any leakage of fluid out of the upper body structure along and around the cutter shaft after the upper wall of a fluid flow line has been cut through and until the lower wall of a fluid flow line has been cut through for positioning of the tubular seal in the hole cut through the fluid flow line. The annular hole cutter is provided with a concave cutting tooth design which permits the holding or retention of the first wall slug in a holding chamber in the cutter body and to permit the annular hole cutter to proceed smoothly and undisturbed through the second wall, and then dispose both wall slugs into a collection or receiving chamber below the cutter at the end of the cutting cycle.

BRIEF DESCRIPTION OF THE DRAWINGS

FIG. 2 is an enlarged, partial, elevation section view of the valve and pressurized fluid flow line structure illustrated in FIG. 1, taken along the line 2—2 thereof, looking in the direction of the arrows, and showing the valve shaft in a retracted position.

FIG. 3 is an enlarged, fragmentary, view of the structure illustrated in FIG. 2, taken within the circle marked by the numeral "3".

FIG. 5 is a partial, elevation section view of the valve structure illustrated in FIG. 4, taken along the line 5—5 thereof, and looking in the direction of the arrows.

FIG. 6 is a horizontal section view of the valve structure illustrated in FIG. 5, taken along the line 6—6 thereof, and looking in the direction of the arrows.

FIG. 7 is an elevation section view of the annular hole cutter employed in the valve of the present invention.

FIG. 8 is a bottom view of the annular hole cutter illustrated in FIG. 7, taken along the line 8—8 thereof, and looking in the direction of the arrows.

FIG. 9 is an enlarged, fragmentary, elevation view of the tooth structure employed on the annular hole cutter illustrated in FIG. 7, taken within the circle marked by the numeral "9".

FIG. 10 is an enlarged, fragmentary, elevation view of the annular hole cutter lower end structure illustrated in FIG. 7, taken within the circle marked by the numeral "10".

DETAILED DESCRIPTION OF THE PREFERRED EMBODIMENT

Figure 1:
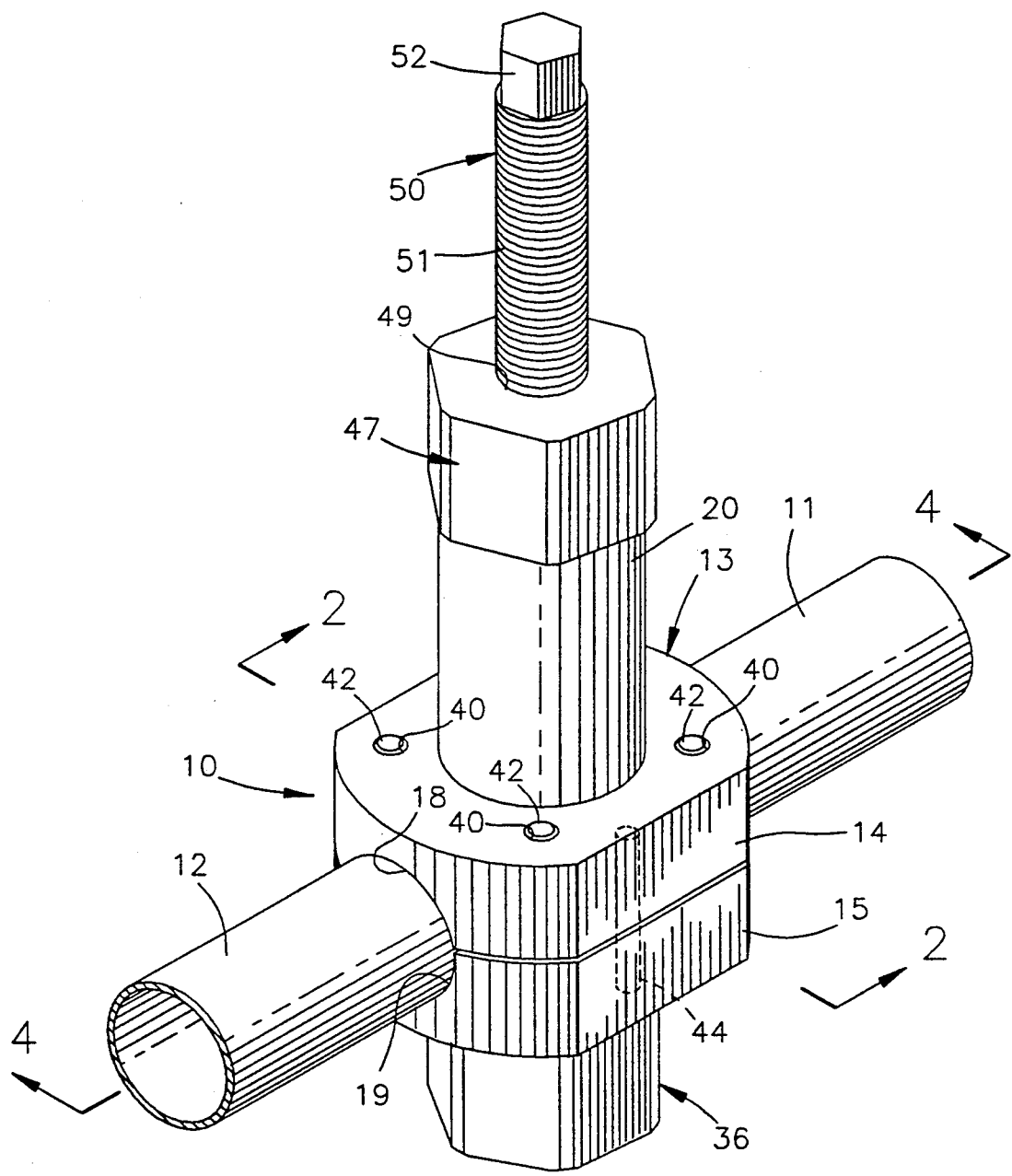
FIG. 1 is an elevation perspective view of the valve of the present invention, and showing the valve mounted on a pressurized fluid flow line.
Figure 4:
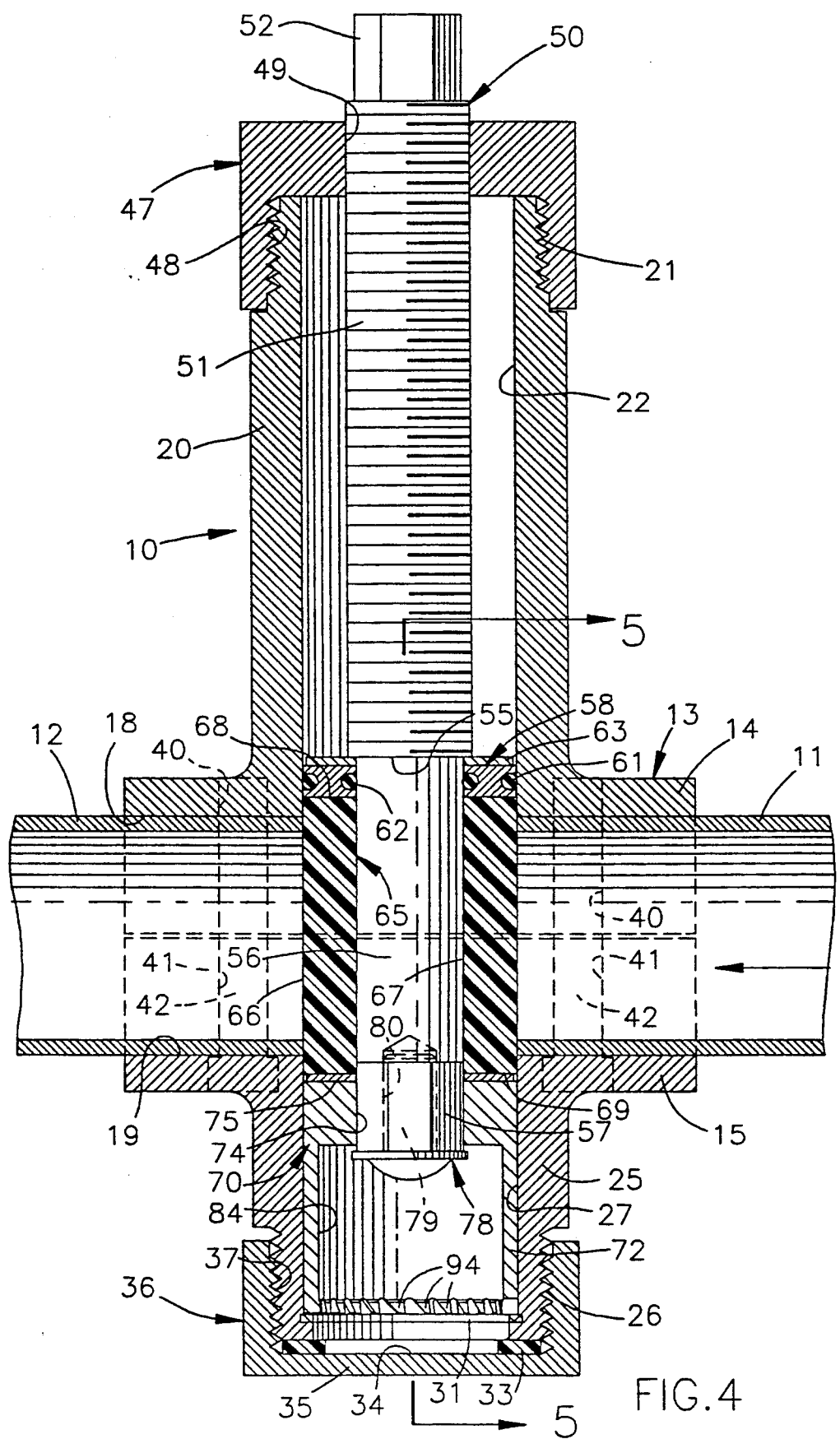
FIG. 4 is an enlarged, elevation section view of the valve structure illustrated in FIG. 1, taken along the line 4—4 thereof, looking in the direction of the arrows, and showing the valve shaft in an advanced position for closing and sealing the flow of fluid through the fluid flow line on which the valve is mounted.

Referring now to the drawings, and in particular FIGS. 1, 2 and 4, the reference numeral 10 generally designates a valve made in accordance with the invention and mounted on a fluid flow line 11, where it is desired to temporarily terminate the flow of fluid through the down stream end 12 of the line 11.

As shown in FIGS. 1, 2, 4 and 5, the valve 10 is provided with a body, generally indicated by the numeral 13, which includes an upper body portion 14 and a lower body portion 15. As best seen in FIGS. 1 and 2, the upper and lower body portions 14 and 15 are provided with longitudinal complementary semicircular bores 18 and 19 respectively, which extend therethrough. The semicircular bores 18 and 19 are formed to dimensions to receive the outer surface of the fluid flow line 11 so that the valve body 13 engages the fluid flow line 11 with a close fit over the line 11.

Figure 11:
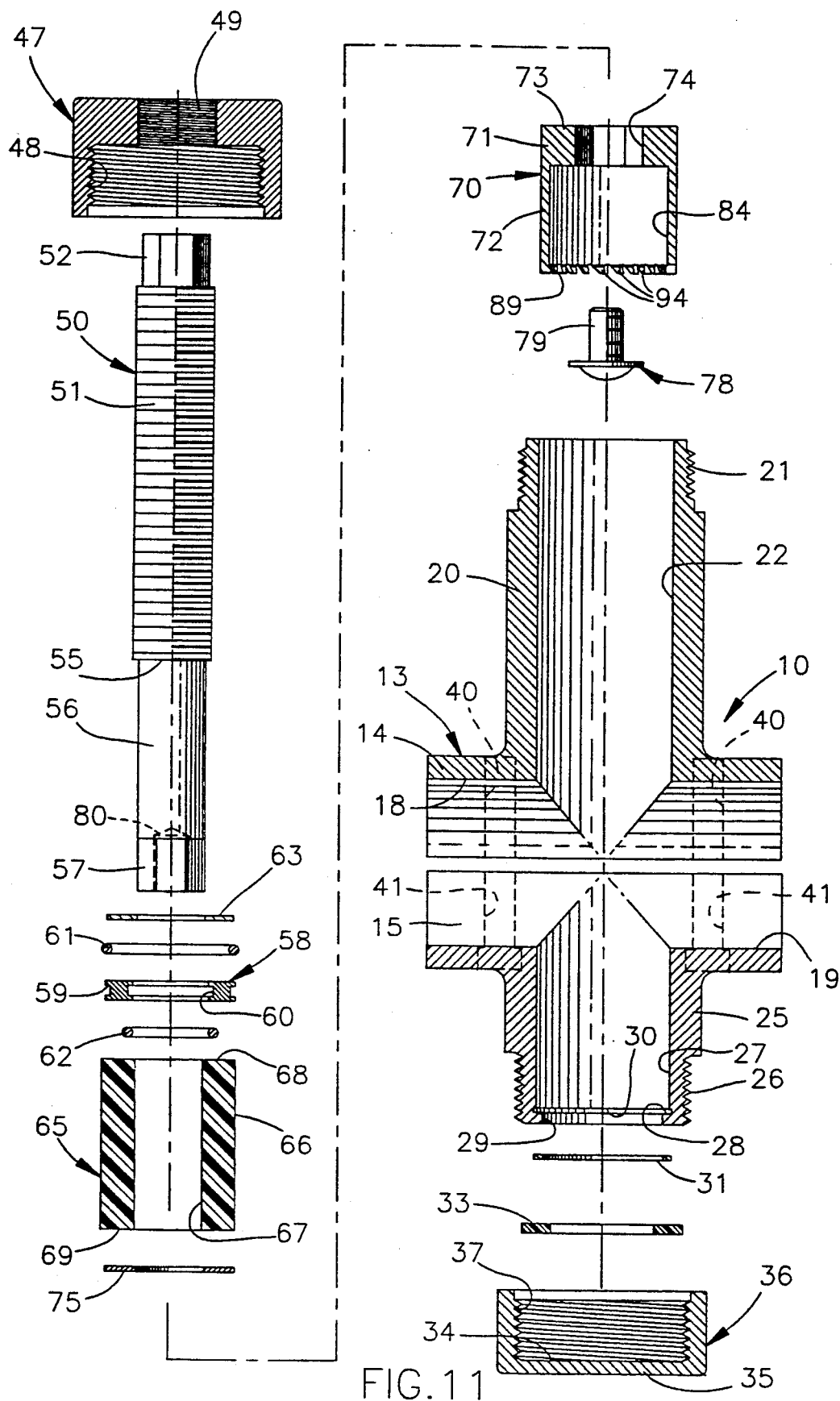
FIG. 11 is an exploded view of the parts of the valve of the present invention, and showing the association of the parts relative to each other.

As best seen in FIGS. 4 and 11, the valve upper body portion 14 is provided with an integral cylindrical extension 20, which extends upwardly, as viewed in the drawings, from the top of the upper body portion 14. The upper body integral cylindrical extension 20 is provided with external standard pipe threads 21 at the upper end thereof. The upper body integral cylindrical extension 20 is provided with a cylindrical bore 22 which extends axially therethrough from the upper end thereof, and which communicates at the lower end thereof with the semicircular bore 18 in the upper body portion 14. The central axis of the axial bore 22 intersects, and is perpendicular to, the longitudinal or central axis of the cylindrical opening formed between the upper and lower body portions 14 and 15 by the complementary semicircular bores 18 and 19. The diameter of the axial bore 22 is smaller than the bore of the cylindrical opening formed by the semicircular bores 18 and 19, and is preferably equal to or slightly larger than the inside diameter of the line 11.

As best seen in FIGS. 4 and 11, the lower body portion 15 is provided with an integral cylindrical extension 25 which extends downwardly from the central part of the lower body portion 15, and which is provided at the lower end thereof with external standard pipe threads 26. As shown in FIGS. 2 and 3, the integral cylindrical extension 25 on the lower body portion 15 is provided with an axial bore 27 which extends downwardly from the semicircular bore 19 to a radially inward extended annular shoulder 28 adjacent the lower end face 32 of the integral cylindrical extension 25. A reduced diameter bore 29 communicates the lower end of the axial bore 27 to the exterior of the lower end of the integral cylindrical extension 25. The axial bores 22 and 27 in the body portions 14 and 15 have equal diameters.

As best seen in FIGS. 2 and 3, an annular groove 30 is formed in the wall of the axial bore 27 in the integral cylindrical extension 25 on the lower body portion 15. The lower side of the groove 30 is coplanar the upper surface of the annular shoulder 28. A flat heavy snap ring retainer 31 is operatively mounted in the groove 30, and it is preferably made from a suitable stainless steel material, such as 316 stainless steel. The annular shoulder 28 extends radially inward for a preferable distance of from minus 0.0 mm to plus 0.4 mm beyond the inner periphery of the snap ring retainer 31. A sealing washer ring 33 is positioned against the lower end face 32 of the integral cylindrical extension 25, and it seats on the inner face 34 of the transverse wall 35 of a bottom cap, generally indicated by the numeral 36. The bottom cap 36 is provided with internal standard pipe threads 37 for mounting the bottom cap 36 on the threaded lower end 26 of the integral cylindrical extension body extension 25 on the lower body portion 15. The bottom cap 36 is a heavy duty, forged brass cap with a hexagonal shaped outer periphery for the reception of a wrench for lightening the cap 36 on the lower body extension 25. The sealing washer ring 33 is made from an elastomeric material sold under the trademark "VITON". The owner of the trademark "VITON" is the Du Pont Company located at 1007 Market Street in Wilmington, Del. 19898.

The upper body portion 14 with its integral cylindrical extension and the lower body portion 15 with its integral extension 25 comprise heavy duty brass forgings to eliminate the porosity and leakage which is inherent in metal castings. The brass forgings for the upper and lower body portions 14 and 15 are made under pressure of 500 pounds per square inch.

The upper body portion 14 is provided with four threaded bores 40 which are formed vertically through the corners of the upper body portion 14, as shown in FIG. 1. As shown in FIGS. 2, 4 and 5, the lower body portion 15 is provided with four counter sunk bores 41 which are formed vertically through the corners of the lower body portion 15, and disposed in vertical alignment with the threaded bores 40 in the upper body portion 14. A stainless steel machine screw 42 is mounted in each of the pair of aligned vertical bores 40 and 41, with the threaded end thereof in threaded engagement in a threaded bore 40. The screws 42 are preferably made from a 316 steel.

A cylindrical opening through the upper and lower body portions 14 and 15 for a fluid flow line 11 is formed by the complementary semicircular bores 18 and 19. In the manufacturing of the upper and lower body portions 14 and 15, they are clamped together by the four machine screws 42, and a cylindrical reaming tool is passed through the complementary semicircular bores 18 and 19, to machine these bores to a diameter commensurate with what-ever size diameter line 11 the valve being manufactured is to be used, as for example ¼ inch diameter line, a ⅜ inch diameter line, and so forth. The last mentioned reaming operation is performed to provide the bores 18 and 19 with the desired finished circular dimension with a tolerance of plus 0.0 mm or minus 0.3 mm. After the reaming operation of the line bore through the valve 10 has been accomplished, a dowel pin bore 43 is machined upwardly into the lower body portion 15 and into the upper body portion 14, as shown in FIGS. 2 and 5. A suitable dowel pin 44 is then mounted in the dowel bore 43, to ensure alignment of the upper and lower body portions 14 and 15, respectively, when they are disassembled and then reassembled on a line 11.

As shown in FIG. 4 the upper body integral extension 20 has threadably mounted thereon an upper cap, generally indicated by the numeral 47. The upper cap 47 is provided with internal threads 48 which mate with the external threads 21 on the integral upper body extension 20. The upper cap 47 has formed therethrough an axial threaded bore 49 for the threaded reception of an elongated threaded shaft, generally indicated by the numeral 50. As shown in FIG. 1, the upper cap 47 is provided with a hexagonal shaped periphery for the reception of a wrench for tightening the upper cap 47 on the upper body extension 20. The upper cap 47 is made from the same heavy duty forged brass from which the valve body 13 is made.

As shown in FIGS. 1 and 4, the threaded shaft or stem 50 is provided on the upper end thereof with a hexagonal shaped head 52 for reception of a socket wrench for turning the shaft 50. The shaft or the stem 50 is made from a 3216 stainless steel. The upper portion of the shaft 50 is threaded, as indicated by the numeral 51, and forty-five computer designed threads per inch is a preferable number of threads per inch for use on the shaft 50. The axial bore 49 in the upper cap 47 is provided with the same type and number of mating threads per inch as on the shaft upper portion 51.

The shaft threaded upper portion 51 terminates at its lower end with an annular transverse downwardly facing flat peripheral shoulder 55, where it is integral with the upper end of a reduced diameter, cylindrical, smooth surfaced, lower shaft portion 56. The lower end of the reduced diameter, cylindrical, shaft portion 56 terminates with an integral driving end 57 which is hexagonal shaped in cross section. As illustrated in FIGS. 2 and 11, a flat steel washer 63 is mounted on the cylindrical shaft portion 56 in a position where its upper surface abuts the shoulder 55 on the lower end of the shaft threaded portion 51. The flat washer 63 is preferably made from a suitable stainless steel material, such as 316 stainless steel. Operatively mounted on the smooth cylindrical, lower shaft portion 56, against the lower side of the steel washer 63, is a brass washer, generally indicated by the numeral 58, which is constructed to function as a carrier of a pair of O-ring seals 61 and 62. The O-ring seal 61 is operatively mounted in an external peripheral groove 59 formed in the outer periphery of the brass washer ring 58 so that it sealingly engages the cylindrical surface of the axial bore 22 in the upper body portion integral cylindrical extension 20. The O-ring seal 62 is operatively mounted in an internal annular groove 60 formed around the inner periphery of the brass washer ring 58, and it sealingly engages the peripheral surface of the shaft cylindrical portion 56. The O-ring seals 61 and 62 are made from an elastomeric material sold under the aforementioned trademark "VITON".

As shown in FIG. 2, a tubular elastomeric seal, generally indicated by the numeral 65, is slidably mounted over the cylindrical portion 56 of the shaft 50, with its upper end 68 abutting the lower side of the brass washer ring 58. The outer diameter of the tubular seal 65 is indicated by the numeral 66, and the inner diameter thereof is indicated by the numeral 67. The lower end of the tubular seal 65 is indicated by the numeral 69. The tubular seal 65 is made from elastomeric material sold under the aforementioned trademark "VITON".

As shown in FIGS. 2, 4 and 5, a hardened steel washer 75 is operatively mounted on the shaft 50 about the lower, hexagonal end 57, and its upper side abuts the lower side 69 of the tubular seal 65, with its lower side being seated against the upper end 73 (FIGS. 7 and 11) of an annular hole milling cutter, generally indicated by the numeral 70.

As shown in FIG. 7, the annular hole milling cutter 70 has an annular head 71 and an integral cylindrical wall 72 extending downwardly therefrom. An axially disposed hole 74, which is hexagonal in cross section shape, is formed through the cutter head 71 and communicates with a cylindrical interior chamber in the cutter 70 which has a diameter 84. Said cylindrical interior chamber extends, from a lower open end of the cutter 70, upwardly and terminates at an upper end wall 85. As shown in FIGS. 4, 5 and 6, the annular hole milling cutter 70 is mounted on the lower hexagonal end 57 of the shaft 50 by slidably receiving the shaft lower hexagonal end 57 in the hexagonal shaped axial opening 74 in the head 71 of the annular hole milling cutter 70. The length of the hexagonal end 57 of the shaft 50 is longer than the axial length of the hexagonal hole 74 in the head 71 of the cutter 70 to permit sliding movement of the shaft hexagonal end 57 through the cutter hexagonal opening 74, as explained in detain hereinafter during operation and use of the valve 10. The annular hole milling cutter 70 is prevented from moving axially downward off of the shaft end 57 by a brass self-locking screw 78 which has the threaded screw shaft 79 thereof operatively mounted into a threaded blind bore 80 formed upwardly inward from the lower end of the shaft hexagonal end 57.

As illustrated in FIG. 10, the inner diameter 84 of the cutter wall 72 extends downwardly, from the upper end 85 of the internal chamber within the cutter 70, to a circular line indicated by the numeral 86. As shown in FIG. 10, the inner wall surface of the cutter 70 angles from the circular line 86 inwardly and downwardly at an angle indicated by the numeral 88, so as to form an annular inwardly sloping, narrow internal chamber wall portion 87, which terminates at its lower end in a diameter 89 which is smaller then the inner diameter 84 of the upper part of said internal chamber. The diameter 89 thus comprises and forms the inner diameter of the lower end of the cutter wall 72, which is also the inner diameter of the inner surfaces of the individual cutting teeth 94 formed on the cutter 70. The angle 88 for the sloping wall portion 87 is preferably an angle of 20 degrees.

The annular hole milling cutter 70 is provided with a plurality of longitudinally extended cutting teeth around the open lower end thereof, and these teeth are indicated by the numeral 94. FIG. 8 shows the cutter 70 as having sixteen cutting teeth 94. Such a cutter would be used for a valve 10 which would be adapted for use on a line 11 having a diameter of 1 inch. It will be understood that for each different size diameter line 11 on which the valve 10 would be used the cutter 70 would have a different number of cutting teeth 94. For example, if the valve 10 is to be used on a ½ inch diameter line 11 the preferred number of cutting teeth would be eight, on a ¾ inch diameter line 11 the preferred number of teeth would be 12, on a 1¼ inch diameter line 11 the preferred number of teeth would be 20, on a 1½ inch diameter line 11 the preferred number of teeth would be 24, on a 2 inch diameter line 11 the preferred number of teeth would be 28, and so forth.

As shown in FIG. 9, a leading radial face of each of the cutting teeth 94 is indicated by the numeral 95, and the lower edge of the leading radial face 95 forms a cutting edge which is disposed on a radial line passing through the longitudnal axis of the cutter 70. As shown in FIG. 9, the cutting edge of each tooth 94 extends circumferentially forward of the tooth front or leading radial face 95 which angles upwardly from the lower end of the cutter 70 and circumferentially rearwardly at an angle indicated by the numeral 96 of between 4 and 6 degrees. A preferred angle for the angle 96 is 5 degrees. The numeral 102 designates the circumferential length of the lower end 101 of a cutter tooth 94 and in one embodiment of the cutter 70 for use on a ¾ inch fluid flow line, the circumferential length 102 was 1.0 mm. The back angle or clearance angle of each cutter tooth 94 is indicated by the numeral 103, and a preferable angle 103, as employed in said one embodiment, is 12 degrees plus or minus 3 degrees.

As shown in FIG. 9, each of the cutting teeth 94 is provided at the upper end thereof with a concave gullet 97, which is formed as a part of a circular arc generated by a radius line from a radius point 98. The radius line in said one embodiment was 1.0 mm with a tolerance of plus 0.5 mm. As is shown in FIG. 9, one end of said circular arc forming the concave gullet 97 meets the upper end of the sloping front surface 95 of a cutting tooth 94. The other end of said circular arc meets the upper end of an upwardly sloping surface 99, which may be called a flute surface. The lower end of the sloping flute surface 99 terminates at the circumferential rear end of an adjacent cutter tooth lower end 101. The angled flute surface 99 slopes upward from the circumferential rear end of the lower end 101 of a cutter tooth 94 and is formed at an angle indicated by the numeral 100, which is preferably an angle of 45 degrees.

In said one embodiment for use on a ¾ inch fluid flow line the length of the cutter 70 was 22.5 mm, the inner diameter 84 of the cutter was 17.95 mm, the outer diameter of the cutter 70 was 20.55 mm, the inner diameter 89 of the cutter 70 was 17.35 mm, the depth of each cutting tooth 94 was 1.5 mm which is measured from the lower cutting edge of the front face 95 of a tooth 94 upwardly to the bottom of the concave gullet 97. The thickness of the head 71 of the cutter 70 for said one embodiment was 6.5 mm and the length of the hexagonal bore 74 through the head 71 was also 6.5 mm. The length of the hexagonal end 57 on the shaft 50 which is slidably mounted in the head axial hexagonal opening 74 was 9.50 mm.

As shown in FIG. 9, a concave gullet 97 extends upwardly through the angled wall portion 87 of the cutter 70. A preferable clearance or tolerance between the bores 22,27 in the valve structure and the outer diameter of the cutter 70 is plus 0.1 mm, or minus 0.15 mm. In said one embodiment for use on a ¾ inch fluid flow line 11 the free or unstressed length of the tubular seal 65 was 30.175 mm and the outer diameter was 0.748 mm.

The tubular seal 65 is a gum synthetic flourinated copolymer of 90-shore hardness available from the aforementioned Du Pont Company under the trademark "VITON" type A. The tubular seal 65 functions to provide a seal member which will deflect radially outward in response to axial compressive forces applied to the seal ends 68 and 69.

In use, a suitable wrench is mounted on the upper hexagonal end 52 of the shaft 50 to rotate to retract the cutter 70 to a position shown in FIG. 2, where it is in a position above the fluid flow line 11 on which the valve body is to be mounted. The surface of the fluid flow line 11 is then cleaned and the valve body upper and lower portions 14 and 15 are then secured over the line 11. Preferably, a suitable fluid sealant is applied to the cleaned outer surface of the line 11 before the valve body 13 is mounted on the line 11. Any suitable fluid sealant may be used and a preferable sealant is a fluid sealant for sealing joints, threads, and the like, and is available from Jomar International, Ltd., 31831 Sherman Drive, Madison Heights, Mich. 48071, under the trademark "W.O.G. plus". After the valve body 13 is securely mounted on the line 11 by the mounting screws 42, the shaft 50 is rotated by means of a suitable wrench applied to the hexagonal upper end 52 to move the cutter 70 downwardly to cut through the upper wall of the line 11. The material or slug cut from the upper wall of the line 11 is caught and held in the holding chamber inside of the cutter 70 while the cutter 70 continues to be advanced until the cutting teeth 94 have cut through the lower wall of the line 11 and engaged a snap ring stop 31. Continued advancing rotation of the shaft 50 then drives the lower hexagonal shaped end 57 of the shaft 50 downwardly through the hexagonal opening 74 in the stationary cutter 70, resulting in an axial compression of the tubular seal 65 between the steel washers 63 and 69. The tubular seal 65 is thus caused to expand radially into a tight sealing engagement with the circular opening formed through the line 11 and provides a 360 degree seal vertically around said opening, and flow through the line 11 is terminated. When the cutter 70 engages the snap ring 31 it is stationary axially, but it rotates with continued downward movement of the shaft 50 to create said axial compression on the tubular seal 65. The snap ring 31 is rotatably mounted in the groove 30 formed in the bore 27 in the body lower axial extension 25 and will rotate with the cutter 70 during the axial compression of the tubular seal 65.

When the tubular seal 65 has been moved into the aforementioned sealing position in the line 11, the lower cap 36 may be removed to permit removal of the chips and the two severed portions or slugs of the line 11 from the interior of the cutter 70 and the interior of the bottom cap 36. The bottom cap 36 is then mounted again on the lower body portion 25, and any necessary downstream repairs or modifications on the line 11 may be accomplished. When the repairs to the downstream side 12 of the line 11 are completed, the shaft 50 may be rotated in a reverse direction to retract the cutter 70 and release the axial compression on the tubular seal 65, and the tubular seal 65 and the cutter 70 is moved back into the upper axial bore 22 in the upper body portion 20 to permit normal fluid flow again through the line 11. The valve 10 may be left permanently in place on the line 11 and can be used as a shutoff valve, if desired.

The angled wall portion 87 in the cutter 70 assists in holding the slug cut from the top wall of the line 11 during the continued rotation and cutting of the bottom wall of the line 11 by the cutter 70. The snap ring 31 is not removable from the groove 30, but it is rotatably mounted in the groove 30 and can rotate with the cutter 70 during the final downward movement of the shaft 50 to create the compression force on the tubular seal 65 to move it into sealing engagement with the line 11 in the hole cut through the line 11.

What is claimed is:

1. A valve (10) for insertion in a fluid flow line (11) comprising:
   (a) a valve body (13) including an upper body portion (14) and a lower body portion (15);
   (b) said upper body portion (14) having a longitudinal semicircular bore (18) on the lower side thereof, and said lower body portion (15) having a longitudinal semicircular bore (19) on the upper side thereof which is complementary with the longitudinal semicircular bore (18) on the upper body portion (14) to form a cylindrical line opening for the reception of a cylindrical fluid flow line (11);
   (c) means (44) for releasably and sealingly clamping the upper (14) and lower (15) body portions over a fluid flow line (11) mounted in said cylindrical line opening;
   (d) said upper body portion (14) being provided with an integral cylindrical extension (20) which extends upwardly from the top of the upper body portion (14), and which has an upper end with external threads (21) formed around the outer periphery thereof, and an axial cylindrical bore (22) that extends therethrough and communicates at the lower end thereof with the semicircular bore (18) in the upper body portion (14) and is perpendicular to said cylindrical line opening;
   (e) said lower body portion (15) being provided with an integral cylindrical extension (25) which extends downwardly from the bottom of the lower body portion (15), and which has a lower end with external threads (26) formed around the outer periphery thereof, and a lower end transverse face, and an axial stepped diameter bore (27,29) with a cylindrical wall that extends therethrough and communicates at the upper end thereof with the semicircular bore (19) in the lower body portion (15) and is perpendicular to said cylindrical line opening and in axial alignment with the cylindrical bore (22) in said upper body portion (14);
   (f) said axial stepped diameter bore (27,29) in the lower body integral cylindrical extension (25) including an upper portion (27) having a first diameter equal to the diameter of the axial cylindrical bore (22) in the upper integral cylindrical extension (20), and a lower portion (29) having a second diameter of a size smaller than said first diameter so as to form an annular, radially inward extended shoulder (28) at a junction point between said bore upper portion (27) and said bore lower portion (29);
   (g) said lower body integral cylindrical extension (25) being provided with an annular groove (30) formed in the wall of the stepped diameter bore upper portion (27) at said junction point, and with the lower side of the annular groove (30) being coplanar with the annular surface of the annular shoulder (28), and having a snap ring stop retainer (31) mounted in said annular groove (30);
   (h) said lower body portion (15) being provided with a bottom cap (36) is threadably mounted on the lower end threaded periphery (37) of the lower body portion integral cylindrical extension (25) and having a transverse wall (35) on the inner side of which is mounted a sealing washer ring (33) that sealingly seats against the lower body portion integral cylindrical extension (25) lower end transverse face (32);
   (i) said upper body portion (14) being provided with an upper cap (47) threadably mounted on the upper end threaded periphery (21) of the upper body portion integral cylindrical extension (20) and having an axial threaded bore (49) formed therethrough;
   (j) an elongated shaft (50) having a threaded upper portion (51) threadably mounted in said axial threaded bore (49) in said upper cap (47) and extending into said axial cylindrical bore (22) in said upper body integral cylindrical extension (20), said elongated shaft threaded upper portion (51) terminating at its lower end with an annular, downwardly facing peripheral shoulder (55) which is formed at the upper end of an integral reduced diameter, smooth surfaced cylindrical lower shaft portion (56), and the lower end of said cylindrical lower shaft portion (56) being integral with the upper end of a driving end (57) which is hexagonal shaped in cross section and which has a threaded axial blind bore (80) extended upwardly therein from the lower end thereof;
   (k) a steel washer (63) mounted on the cylindrical lower shaft portion (51) with an upper side thereof seated against the shaft peripheral shoulder (55);

(l) an O-ring seal carrier ring (58) mounted on the cylindrical lower shaft portion (56) below the steel washer (63) with an upper side thereof seated against the steel washer (63) and having an external peripheral O-ring seal (61) mounted in an external peripheral groove (59) formed in the O-ring seal carrier ring (58) and slidably and sealingly engaging the axial cylindrical bore (22) in the upper body portion cylindrical extension (20), and having an internal peripheral O-ring seal (61) mounted in an internal peripheral groove (60) formed in the O-ring seal carrier ring (58) and sealingly engaging the periphery of the cylindrical smooth surfaced lower shaft portion (56);

(m) a tubular elastomeric fluid flow line seal (65) is slidably mounted on the cylindrical lower shaft portion (56) with an upper end (68) seated against the O-ring washer ring (58) and which has a cylindrical outer surface that makes a slip fit within the axial cylindrical bore (22) in the upper body portion cylindrical extension (20);

(n) a steel washer (75) is mounted on the cylindrical lower shaft portion (56) against a lower end (69) of the tubular line steel (65);

(o) an annular hole cutter (70) having a cylindrical head (71) and an integral tubular cylindrical wall (72) extending downwardly from said head (71), and said annular hole cutter (70) being slidably mounted in the axial cylindrical bore (22) in the upper body portion cylindrical extension (20) and being provided with an axially disposed hole (74) formed through said cylindrical head (71) which is hexagonal shaped in cross section and in which is received the hexagonal shaped driving end (57) of the shaft (50) and said annular hole cutter (70) is retained on said shaft (50) in seating engagement against the steel washer (75) mounted on the lower shaft portion (56) by a self-locking screw (78) operatively mounted in the threaded blind bore (80) in the shaft driving end (57);

(p) said annular hole cutter (70) is provided on the lower end of the tubular cylinder wall (72) with a plurality of downwardly extended cutting teeth (94) to provide the cutter (70) with a lower open end and an internal holding chamber for holding a slug cut from the upper wall of a fluid flow line (11) on which is mounted, each of the cutting teeth (94) being provided with a cutting edge which is disposed on a radial line passing through the longitudinal axis of the cutter (70), and the cutting edge of each tooth (94) extends circumferentially forward of the tooth front radial face (95) which angles upwardly from the lower end of the cutter and circumferentially rearwardly at an angle (96) between 4 and 6 degrees, each of the cutting teeth (94) being provided with a circumferential rearwardly extended back angle (103), and each of the cutting teeth (94) being provided at the upper end thereof with a concave gullet;

(q) whereby when the shaft (50) is rotated in one direction to retract the cutter (70) and tubular seal (65) upwardly into the bore 22 in the upper body portion (20) the upper and lower body portions (14,15) may be clamped onto a fluid flow line (11) and when the shaft (50) is rotated in the opposite direction to advance the cutter (70) and tubular seal (65) downwardly, the cutter (70) will cut an opening through the upper wall of the fluid flow line (11) and remove a slug which will pass upwardly into the holding chamber in the cutter (70), and continued advancing movement of the shaft (50) will move the cutter (70) into a cutting engagement with the lower wall of the fluid flow line (11) and cut an opening therethrough, and continued downward movement of the shaft (50) moves the tubular seal (65) into the hole cut through the fluid flow line (11) and the cutter (70) to a stop position against the snap ring (31) to permit the lower end (57) of the shaft (50) to slide downwardly through the opening (74) in the head (71) of the cutter (70), after said cutter (70) has reached said stop position to permit a portion of said shaft (50) above said seal carrier ring (58) to engage said steel washer (63) to force said seal ring carrier (58) into engagement with said tubular seal (65) to create an axial compression on the tubular seal (65) and expand it radially outward against the surrounding surfaces of the holes cut through the upper and lower walls of the fluid flow line (11) to block and seal fluid flow through said line (11), and prior to said cutter (70) reaching said stop position and said compression of said tubular seal (65), said seal carrier ring (58) prevents any fluid leakage that gets around said tubular seal (65) to get beyond said seal carrier ring (58).

2. A valve (10) for insertion in a fluid flow line (11) as defined in claim 1, wherein:
  (a) the valve body (13) and the upper and bottom caps (47,36) are each made from forged brass.

3. A valve (10) for insertion in a fluid flow line (11) as defined in claim 2, wherein:
  (a) the O-ring carrier (58) and the self-locking screw (78) are formed from forged brass.

4. A valve (10) for insertion in a fluid flow line (11) as defined in claim 3, wherein:
  (a) the upper cap (47) and the bottom cap (36) are formed with a hexagonal outer configuration.

5. A valve (10) for insertion in a fluid flow line (11) as defined in claim 4, wherein:
  (a) said shaft (50) is formed from a stainless steel.

6. A valve (10) for insertion in a fluid flow line (11) as defined in claim 1, wherein:
  (a) said tubular seal (65) is formed from an elastomeric material comprising a gum synthetic florinated copolymer having a 90-shore hardness.

* * * * *